Feb. 10, 1959     E. D. WILKERSON     2,872,951
HYDRAULIC BRAKE SYSTEM BLEEDING AND REFILLING APPARATUS
Filed Sept. 21, 1956
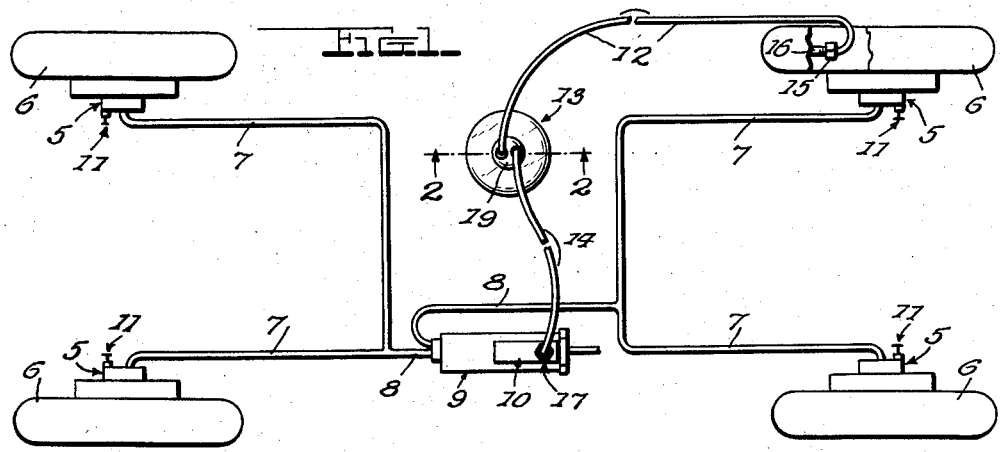
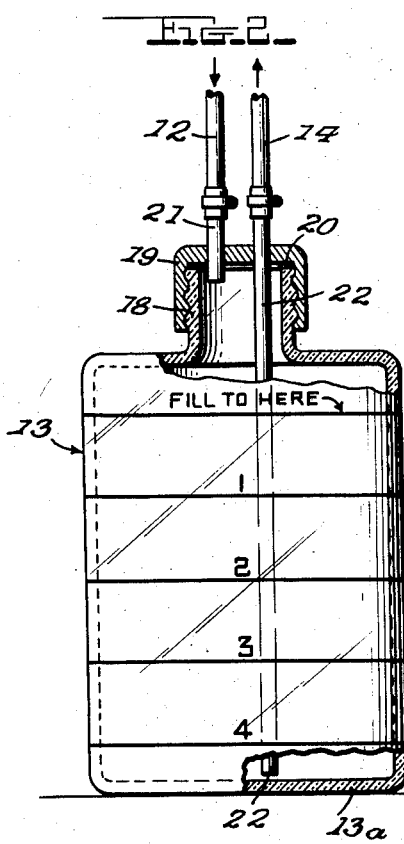
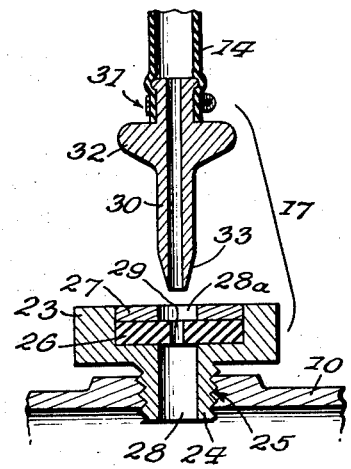
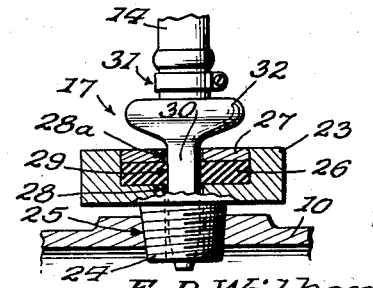
INVENTOR
E. D. Wilkerson
BY
ATTORNEYS United States Patent Office 2,872,951
Patented Feb. 10, 1959

2,872,951

HYDRAULIC BRAKE SYSTEM BLEEDING AND REFILLING APPARATUS

Edward D. Wilkerson, Livingston, N. J.

Application September 21, 1956, Serial No. 611,244

3 Claims. (Cl. 141—94)

This invention relates to a new and improved apparatus for bleeding air from hydraulic brake systems and for refilling the systems with fresh brake fluid, and the invention is an improvement on the apparatus disclosed in my U. S. Patent No. 2,670,874 of March 2, 1954.

The patented apparatus conducts compressed air from a vehicle tire to a brake fluid reservoir and pneumatically drives brake fluid from said reservoir into the usual brake fluid reservoir of the brake system and on through the hydraulic line and the branches thereof leading to the customary wheel cylinders, thus driving air from the system through the usual bleed valves and refilling the system.

The brake fluid reservoir of the patented apparatus is opaque and the operator cannot therefore see when said reservoir is about empty. Obviously, should it become completely empty, compressed air would be driven into the brake system and further trouble would result. Therefore, to prevent this, a float valve is provided in the fluid conducting line from the apparatus reservoir to the brake system reservoir, said float valve being constructed to remain open as long as it is immersed in brake fluid and being adapted to close when in the presence of no brake fluid. However, this valve has not proven entirely satisfactory and moreover it adds to the cost of manufacturing the apparatus.

I have given considerable thought to the desirability of eliminating the float valve but have been confronted with the problem of assigning its function to something else. I have decided that the best solution for eliminating the valve is to leave to the operator of the apparatus the duty of discontinuing the discharge of brake fluid from the reservoir before the latter becomes completely empty. This has given use to the necessity of making some adequate provision for keeping the operator informed as to the quantity of brake fluid present at any time in the reservoir. I have concluded that the best way to accomplish this is by substituting a transparent reservoir for the opaque reservoir of the patented apparatus. This substitution makes possible the elimination of the float valve and provides an improved and simplified apparatus.

I am aware that the mere substitution of one old element for another does not require invention. I am also aware that the mere elimination of an element with a corresponding loss of function, does not rise to the dignity of inventive genius. However, when a substitution of one old element for another makes possible the elimination of another element, as in the present case, quite a different situation exists and it does not seem that the substitution is a mere substitution, nor that the elimination is a mere elimination. On the contrary, it seems that invention has been required and this application seeks to protect that invention.

Another drawback with the patented apparatus is that there is no way of determining when equal quantities of fresh brake fluid have been supplied to all of the line branches leading to the brake units of the four vehicle wheels. This difficulty is also overcome by the present invention, by providing the transparent reservoir with conspicuous indicating lines so arranged as to enable the operator to determine when a predetermined quantity of brake fluid has been supplied to each branch line during bleeding of air therefrom.

In the patented apparatus, one end of the brake fluid line leading from the reservoir is provided with a threaded fitting to engage the customary threads of the filling opening of the brake system reservoir. It is rather difficult to thread this fitting into the filling opening as it is attached to the brake fluid line and the latter is attached to the reservoir. The present invention, therefore, provides a new and improved coupling means for overcoming this difficulty.

With the above and other objects in view that will hereinafter appear, the nature of the invention will be more clearly understood by reference to the following detailed description, the appended claims and the several views illustrated in the accompanying drawing.

In the drawing:

Figure 1 of the accompanying drawing is a diagrammatic illustration of a hydraulic brake system of a motor vehicle with the improved apparatus operatively connected therewith.

Figure 2 is a vertical sectional view through the fluid reservoir of the apparatus, on line 2—2 of Figure 1, partly in elevation.

Figure 3 is a vertical, sectional view, through the two elements of the improved coupling which connects the brake fluid line with the brake system reservoir, said elements being shown separated.

Figure 4 is a similar view, partly in elevation, showing the two elements engaged with each other.

Figure 1 diagrammatically illustrates a four wheel hydraulic brake system and the invention operatively connected therewith. The hydraulic brake applying units 5 of the four wheels 6 are connected to the four branches 7 of a brake fluid line or lines 8 leading from the master cylinder 9. The customary brake fluid reservoir of the master cylinder is indicated at 10. Each branch 7 and associated unit 5 has a bleed valve as usual, the four bleed valves being indicated at 11.

As in the patented apparatus, above mentioned, a flexible air line 12 extends to a brake fluid reservoir 13; and a flexible brake fluid conducting line 14 extends from said reservoir 13. One end of the air line 12 is provided with a fitting 15 to engage and open one of the tire valves 16, thereby supplying air pressure to the reservoir 13 to force hydraulic fluid therefrom into the brake system through the line 14. This line 14 is provided with an improved coupling 17 for connecting it with the reservoir 10.

The reservoir 13 is in the form of a jar formed from transparent plastic or glass and of sufficient strength to withstand any normal tire pressure supplied to it through the air line 12. The bottom 13a of this jar is flat to rest upon a garage floor or the like. The top of the jar has a threaded neck 18 upon which a screw cap 19 is threaded; and a suitable sealing gasket 20 is interposed between said neck and said cap. The cap 19 carries a suitable nipple 21 to which the air line 12 is connected. The cap also carries a duct tube 22 extending to the bottom of the jar or reservoir 13, the outer end of said tube 22 being connected to the fluid conducting line 14.

The transparent jar or reservoir 13 has conspicuous indicating lines to enable the operator to determine the level of brake fluid in said jar or reservoir 13 at any time. The uppermost of these lines may be identified by the words "Fill to Here." The other lines may be identified by the numbers "1," "2," "3," "4." The jar or reservoir volume between any two successive lines corresponds to the quantity of brake fluid which should be supplied to each branch 7 and unit 5, upon opening of the bleed valve 11, to bleed all air from said branch and unit and refill them with fresh fluid.

Prior to connecting the apparatus with the brake system, the jar or reservoir 13 is filled to the upper or fill line. The fluid line 14 is then coupled to the brake system reservoir 10, and then the air line 12 is coupled to the tire valve. The apparatus is thus placed in readiness for operation. Upon opening of the first bleed valve 11, air pressure will force brake fluid from the jar or reservoir 13 into the brake system to bleed air from the line 7 and unit 5 opened by said bleed valve and to simultaneously refill said line and unit with fresh fluid. Upon opening of the bleed valve 11, the operator watches the descent of brake fluid in the jar or reservoir 13 and as soon as the fluid level reaches the indicating line "1," he closes said bleed valve. He thus knows that the proper quantity of fluid has been forced into the first line 7 and unit 5. The operator then repeats these operations for the second wheel, stopping when the fluid level reaches indicating line "2" and so on until the units 5 and the hydraulic lines for all four wheels have been bled and refilled. Then, the air line 12 is uncoupled from the tire valve 16 and finally the fluid line 14 is uncoupled from the brake system reservoir 10.

Both coupling and uncoupling of the fluid line 14, with respect to the reservoir 10, are facilitated by the improved coupling means 17 which will now be described. (See Figures 3 and 4.)

A cupped metal body 23 is provided with a threaded nipple 24 dimensioned to engage the usual threads of the filling opening 25 of the reservoir 10; and a resilient compressible seal disk 26 of rubber or the like, is secured in said body by a metal disk 27. The body 23 and disk 27 jointly form a hollow head having a nipple and also having a passage 28, 28a therethrough. The sealing disk 26 extends across this passage and has a central opening 29 of much smaller diameter than the passage 28, 28a.

A tubular needle 30 is connected at 31 with the free end of the fluid line 14 and is provided at its inner end with a finger grip 32, the outer end of said needle 30 being gradually tapered at 33. The "point" of the needle is dimensioned to be readily started into the opening 29 of the sealing disk 26 and the body of said needle is of much larger diameter than said opening 29. Forcing of the needle 30 entirely through the opening 29, will radially compress the sealing disk 26 and position the needle fully in the passage 28, 28a, thereby providing a tight connection between the fluid line 14 and the reservoir 10. This connection, however, may be easily severed by simply pulling the needle 30 from the passage 28, 28a, but before this is done, the fitting 15 is removed from the tire valve 16 to prevent waste of brake fluid through said needle.

After withdrawing the needle 30, the head 23, 27, seal 26 and nipple 24 may be easily removed as a unit from the reservoir 10, as this unit is then free from the line 14. Also, as this unit can be connected with the reservoir 10 before connecting it with the line 14, easy connection, unhampered by said line, may be effected.

In hydraulic brake service many times it is desirable to replenish the brake fluid in the master cylinder so as to bring it back to proper level even though the bleeding operation is not to be performed. In such cases a bleeder should be equipped with a discharge nozzle small enough to be easily inserted between obstructions in the operator's effort to reach the filling opening in the master cylinder. The present bleeder offers a very simple and quick way of doing this merely by using the needle 30 as a fluid discharge when only refilling the master cylinder is required.

It will be seen from the foregoing that distinct improvements have been made over the construction disclosed in my prior patent, above identified. These improvements make possible a reduction in manufacturing cost and provide a more effectively and more conveniently useable apparatus.

I claim:

1. In a hydraulic brake system bleeding and refilling apparatus of the general type comprising an air pressure line, a brake fluid conducting line, and a fluid reservoir connected to one end of the brake fluid conducting line; the improvement consisting of a transparent reservoir connected to the air pressure line and to the other end of the brake fluid conducting line, and in the provision of visible indicating lines on said transparent reservoir and arranged to define four equal predetermined fluid volumes and enable the operator to supply equal quantities of brake fluid to each of the usual four line branches of the brake system.

2. A hydraulic brake system bleeding and refilling apparatus comprising a transparent brake fluid jar having a flat bottom to rest on a support, said jar having a threaded neck and a screw cap fluid tightly engaged with said neck, said cap having an air admission duct, a fluid discharge duct connected with said cap and extending from the bottom of said reservoir, a compressed air supply line connected at one of its ends with the outer end of said air admission duct, said air line having means for connecting the other of its ends with a tire valve to receive air from the tire, a fluid conducting line connected at one of its ends with the outer end of said fluid discharge duct, and means at the other end of said fluid discharge line for connecting it with the usual fluid reservoir of a brake system, said jar being of sufficient strength to withstand any normal air pressure from the tire, said jar having conspicuously visible indicating lines arranged to define four equal predetermined fluid volumes and enable the operator to supply equal quantities of brake fluid from said jar to each of the usual four line branches of the brake system the lowermost of said indicating lines being disposed at a level well above the level of the receiving end of said discharge duct.

3. In a brake system bleeding and refilling apparatus having a brake fluid conducting line for connection with the usual fluid reservoir of a brake system; a hollow head having a threaded nipple for tight reception in the usual filling opening of the reservoir, said head and nipple having a passage therethrough, a resilient compressible sealing member fluid tightly secured in said head and extending across said passage, said sealing member having a relatively small opening aligned with said passage, and a tubular needle connected with the discharge end of said fluid conducting line for insertion through said passage and said relatively small opening, said needle being of greater diameter than said relatively small opening and the outer end of said needle being tapered; whereby said needle will radially compress said sealing member as said needle is forced through said relatively small opening, thereby providing a fluid tight connection between said fluid conducting line and the fluid reservoir.

References Cited in the file of this patent

UNITED STATES PATENTS

| | | |
|---|---|---|
| 89,509 | Fanyon | May 4, 1869 |
| 823,932 | Corcoran | June 19, 1906 |
| 2,670,874 | Wilkerson | Mar. 2, 1954 |